INVENTOR
ROSWELL J. BENNETT
BY
ATTORNEY

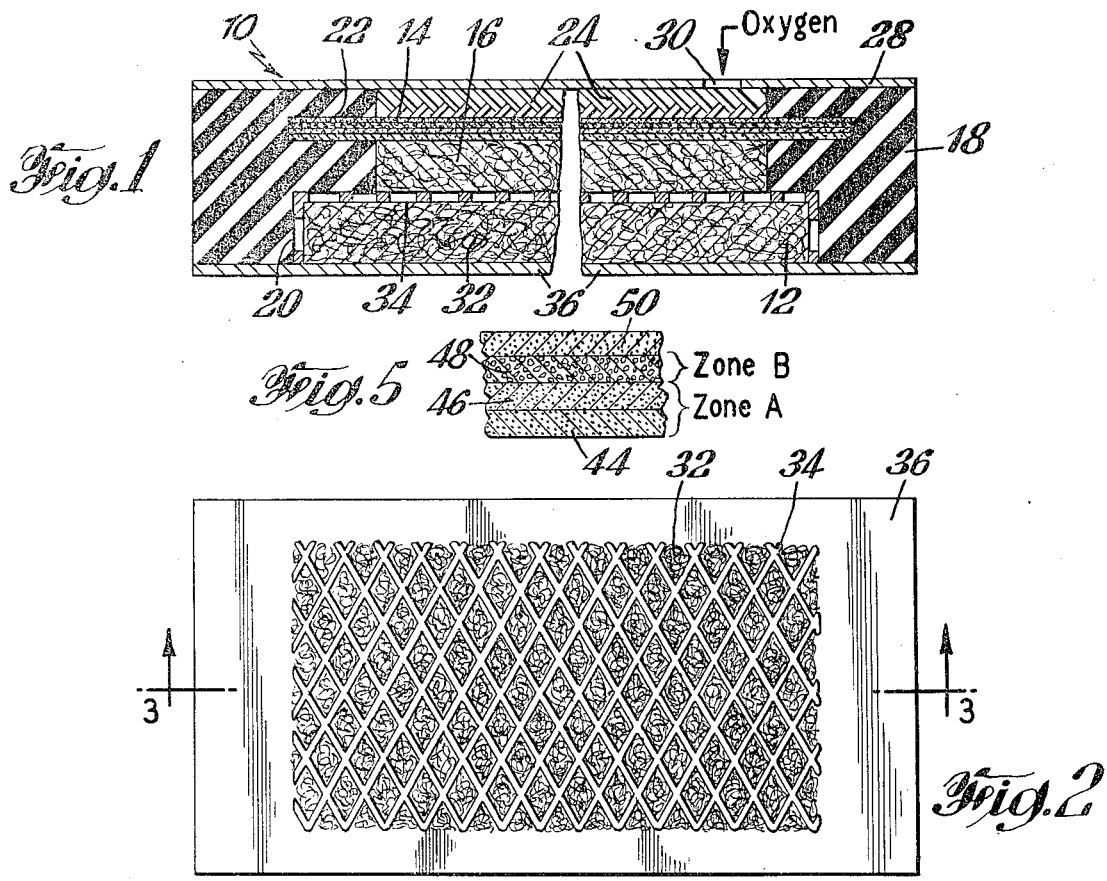
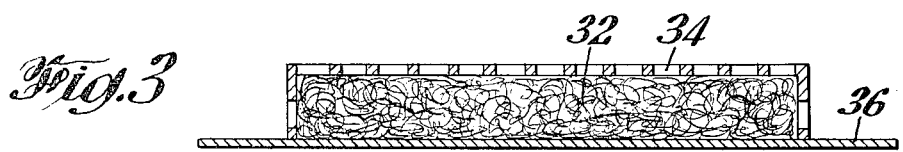

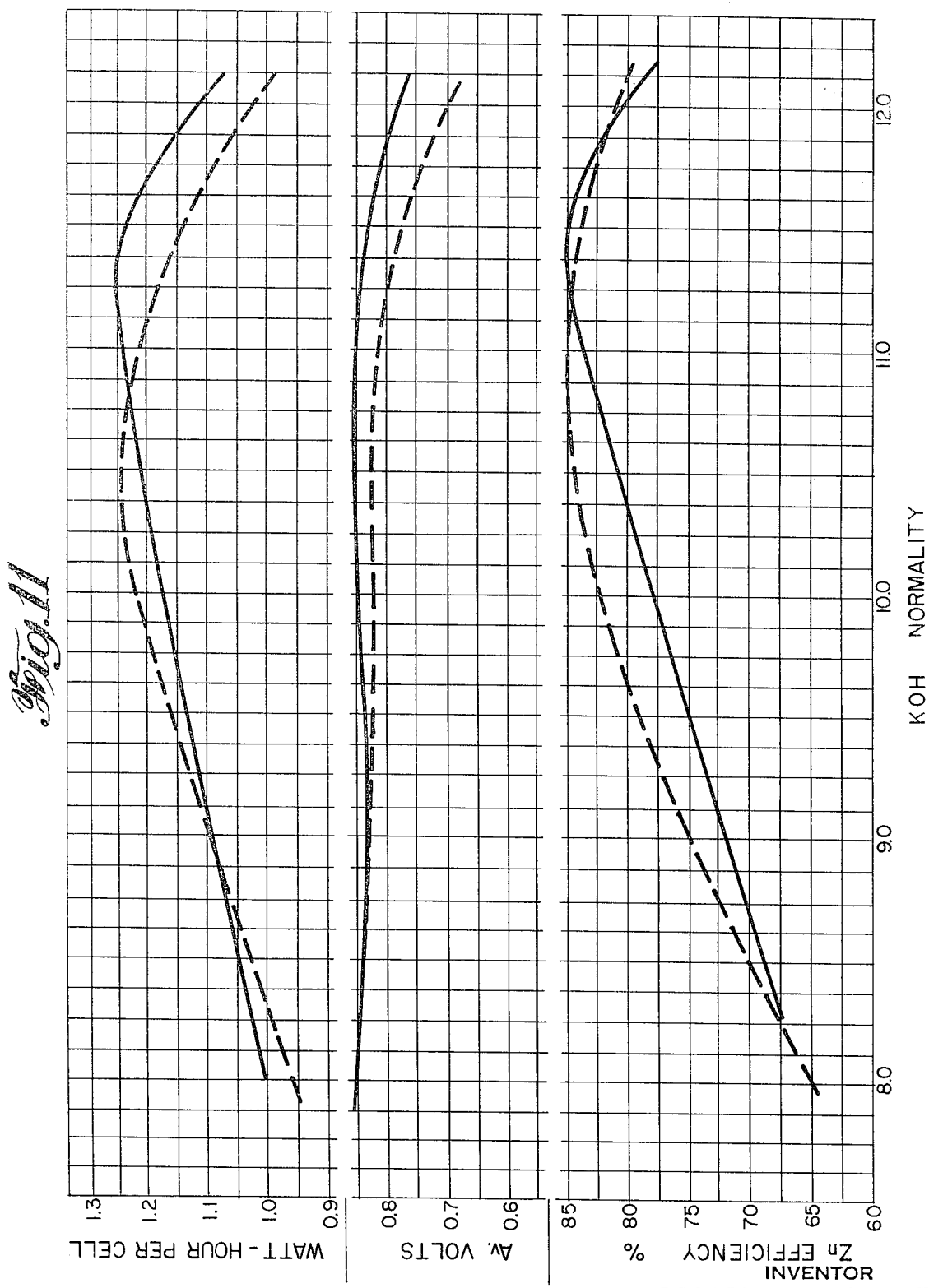

United States Patent Office 3,674,563
Patented July 4, 1972

3,674,563
OXYGEN-DEPOLARIZED GALVANIC CELL
Roswell J. Bennett, Lakewood, Ohio, assignor to Union Carbide Corporation, New York, N.Y.
Filed Apr. 6, 1970, Ser. No. 25,867
Int. Cl. H01m 29/04
U.S. Cl. 136—86 A
17 Claims

ABSTRACT OF THE DISCLOSURE

Disclosed is a high performance oxygen-depolarized galvanic cell which is capable of supplying electric power at extremely high electrode current densities. The cell basically includes a porous, electrolyte absorbent, extended area anode made from an electrochemically active metal, a thin, porous fixed zone oxygen-depolarizable cathode and a porous ionically permeable separator interposed between the anode and cathode and containing an alkaline electrolyte, the alkaline electrolyte being an aqueous solution of potassium hydroxide having a concentration of between about 10 and 14 normal.

This invention relates generally to oxygen-depolarized galvanic cells. More particularly, the invention relates to a high performance oxygen-depolarized cell which is capable of supplying electric power at extremely high electrode current densities.

Oxygen-depolarized cells of the type to which the invention relates consist basically of a consumable anode made from an electrochemically active metal such as zinc, cadmium or iron, a porous oxygen-depolarizable cathode suitably made of carbon and an alkaline electrolyte such as an aqueous solution of potassium hydroxide. In operation, an oxidant gas such as oxygen or air is continuously fed to the gas-cathode interface of the porous oxygen-depolarizable cathode and diffuses through the cathode to the cathode-electrolyte interface where an ionization reaction occurs. The anode is continuously consumed electrochemically producing useful electric power.

Oxygen-depolarized cells of the type described have been produced and used commercially over the past three decades or more. Cells of this type have been generally restricted to low rate, long life, stable voltage applications. In spite of their long commercial use, these cells have not been seriously considered for high performance service mainly because of their limited current range and low ratio of power output to unit of volume and weight.

One of the major factors which has limited the performance of oxygen-depolarized cells is that these cells have utilized relatively thick porous carbon electrodes. The use of thick porous carbon electrodes has been necessary in the past in order to fulfill the requirements of the cathode, namely that the cathode permit the passage of the oxidant gas into the interior portions thereof from those sides or faces exposed to the oxygen gas or air, while at the same time acting as a barrier to the electrolyte at the other sides, i.e., those sides or faces exposed to the electrolyte. In actual practice, the electrolyte should slightly penetrate into the porous carbon electrode sufficiently to meet the oxidant gas in an interior portion or reaction zone. The porous carbon electrode should nevertheless be sufficiently electrolyte-repellent in order to prevent the electrolyte from flooding the pores of the electrode and rendering it inoperable, a condition often referred to as "electrode drowning." To avoid this condition, attempts have been made to improve the electrolyte-repellency of the porous carbon electrode suitable by subjecting the electrode to a wet-proofing treatment. Invariably, however, the porous carbon electrode has been made relatively thick in order to fulfill the requirements of the cathode. Consequently, the current carrying capabilities of this electrode were still severely limited because of the long diffusion path between the gas entry surface and the cathode-electrolyte interface.

Recent technological developments in the fabrication of porous, gas-diffusing fuel cell electrodes have now made it possible to use relatively thin cathodes in oxygen-depolarized cells. Thus in U.S. Pat. No. 3,423,247 issued to W. G. Darland, Jr. et al. on Jan. 21, 1969, there is disclosed and claimed a so-called "fixed zone" cathode which can be made relatively thin and yet still fulfill all the requirements of the cathode without electrode drowning. As disclosed in that patent, this electrode comprises a porous conductive body suitably molded from finely-divided carbon particles having at least two zones; a first zone extending inwardly from the electrolyte side of the electrode which is highly permeable to the liquid electrolyte and extremely active electrochemically; and a second zone, adjacent the first zone, which is gas permeable and highly repellent to the liquid electrolyte. In the preferred form of the electrode, each zone is made up of a plurality of layers so as to provide gradients of electrolyte-repellency and electrochemical activity between the two surfaces. Proceeding from the electrolyte side to the gas side of the electrode, the electrolyte-repellency increases, while the electrochemical activity decreases. By providing such an electrode having an active electrolyte-permeable zone and an adjacent gas-permeable, electrolyte-repellent zone, an effective gas-electrolyte-electrode interface can be established within a minimum electrode thickness.

Despite the significant improvement made possible by the provision of "fixed zone" cathodes, oxygen-depolarized cells still nonetheless have not proven satisfactory for high performance applications. This is due mainly to the inability of the metal anodes, notably the zinc anode, to operate at the high electrode current densities demanded. Heretofore, the metal anode has been used in the form of a dense solid plate or sheet electrode which tends to passivate quickly in the alkaline environment forming a dense oxide film on its surfaces rendering the electrode inoperable. Illustratively, solid sheet zinc electrodes when used in an oxygen-depolarized cell possess a limiting current density of only between about 200 and 300 amperes per square foot.

It has already been proposed to employ metal anodes in oxygen-depolarized cells which are fabricated from a high surface area active material, such as zinc powder, in order to reduce the tendency of the electrodes to passivate and also to obtain satisfactory high current density performance by more efficient utilization of the active material. Such anodes have been made by suspending zinc powders within a suitable gelling agent such as carboxymethyl cellulose containing the alkaline electrolyte, these anodes being often referred to as "gelled powder anodes."

The difficulty with anodes of this type is that the gelling agent which is electrochemically inactive and thus capable of performing no useful purpose other than to support the zinc powder, takes up considerable space which might otherwise be occupied by the active material and consequently its use necessarily reduced the volumetric efficiency of the cell. In addition, these gelled powder anodes are capable of performing at only modestly increased current densities such that oxygen-depolarized cells using such anodes are still limited to fairly low rate applications.

Still another difficulty encountered with oxygen-depolarized cells employing a zinc anode is the formation of a crystalline zinc hydroxide reaction product which precipitates from the electrolyte upon discharge. The formation of this precipitate is disadvantageous because it tends to cause passivation of the zinc electrode and to lower the operating voltage of the cell.

It is the prime object of this invention to provide a high rate oxygen-depolarized cell which is capable of use in high performance applications.

More specifically, another object of this invention is to provide a high rate oxygen-depolarized cell which utilizes electrodes capable of performing at very high current densities.

Another object of this invention is to provide a high rate oxygen-depolarized cell having an high energy density per unit of volume and weight and which can be assembled in a relatively small size while still delivering substantial quantities of electric powder.

Still another object of this invention is to provide a high rate oxygen-depolarized cell utilizing an aqueous alkaline electrolyte, the normality of which is such as to cause the precipitation of a reaction product which does not passivate the metal electrode on discharge of the cell.

Other objects, aims and advantages of the invention will become more apparent from the following detailed description taken in conjunction with the accompanying drawing, wherein;

FIG. 1 is an elevational, cross-sectional view of a typical high rate oxygen-depolarized cell embodying the invention;

FIG. 2 is a plan view of a preferred form of metal anode used in the cell of FIG. 1;

FIG. 3 is a cross-sectional view of the metal anode, taken along the line 3—3 in FIG. 2;

FIG. 4 is a plan view of another form of metal anode;

FIG. 5 is a fragmentary sectional view of the porous fixed zone, oxygen-depolarizable cathode used in the cell of FIG. 1;

FIG. 11 is a graph showing the relationship of electrolyte concentration to the performance of the oxygen-depolarized cells of the invention.

Figure 6:
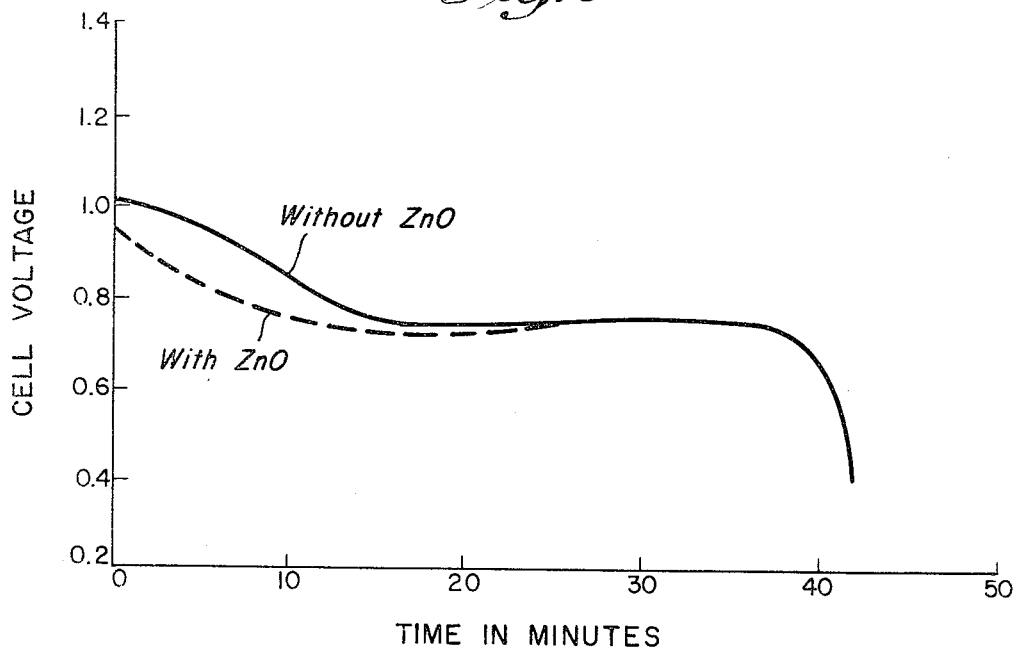
FIG. 6 is a graph illustrating cell discharge with and without the addition of zinc oxide to the electrolyte.

In accordance with the invention, a high rate oxygen-depolarized cell is provided which comprises a porous, electrolyte absorbent, extended area anode made from an electrochemically active metal, e.g., zinc; a thin, porous, oxygen-depolarizable cathode of the "fixed zone" type having at least a first zone extending inwardly from the electrolyte side of the electrode, which is highly permeable to the liquid electrolyte and extremely active electrochemically, and a second zone, adjacent to the first zone, which is gas-permeable and highly repellent to the liquid electrolyte; and a porous ionically permeable separator interposed between the anode and cathode and containing an alkaline electrolyte, the alkaline electrolyte being an aqueous solution of potassium hydroxide having a concentration of between about 10 and 14 normal.

The porous, electrolyte absorbent, extended area metal anode used in the oxygen-depolarized cell in accordance with the invention is provided as an anode compact comprising randomly orientated, elongated forms of the electrochemically active metal, e.g., zinc, which are pressure-formed into intimate, multi-point physical contact with one another throughout the body of the anode compact.

"Elongated forms" of the electrochemically active metal as the term is used herein and in the appended claims, means those forms of the metal which possess a length many time greater than the width or diameter thereof.

Unlike other forms such as spherical forms of the metal, the elongated forms possess a relatively high surface area and are more readily amendable to being pressure formed into randomly orientated, multi-point physical contact with one another to produce a highly porous, cohesive anode compact capable of supporting its own weight.

Included particularly within the practice of the invention are elongated forms of zinc such as mechanically or electrolytically formed zinc filaments, e.g., zinc fibers, needles and the like, as well as fabricated forms of the metal such as expanded zinc metal. Other examples of elongated forms of the metal which can be used to fabricate the anode include zinc wool, thread, wire, shaper chips, milling machine chips, lathe turnings, and woven mats such as zinc screen.

Both mechanically and electrolytically formed filaments of the electrochemically active metal are already known in the art. Mechanically formed filaments such as zinc fibers can be made by conventional metal working or cutting techniques as used in the production of metal wool pads. Electrolytically formed fibers are well-known such as the dendritic zinc fibers disclosed in U.S. Pat. No. 3,071,638 issued to M. B. Clark et al. on Jan. 1, 1963. These electrolytic zinc fibers possess a high specific surface area (approximately 4 to 7 square meters per gram) and are highly pyrophoric. As disclosed in the patent, the fibers should be thoroughly amalgamated in order to permit their use in fabricating anodes.

In the copending application Ser. No. 25,490 of D. V. Louzos, filed on even date herewith there is disclosed and claimed electrolytically formed zinc fibers and needles which are most advantageously used in the fabrication of anodes for the oxygen-depolarized cell of the invention. These electrolytically formed zinc fibers and needles possess a surface area of between about 0.4 and 0.6 square meters per gram, which is considerably higher than that of conventional zinc powder but which at the same time is not so highly developed as to be pyrophoric and susceptible to rapid oxidation upon exposure to the atmosphere. The zinc fibers and needles are quite readily distinguishable in physical appearance in that they consist basically of a thin elongated central spine portion with a number of polydirectional side growths or branches. The crystal structure of the zinc fibers and needles is also unique in that the central spine portion consists of one or more single crystals having a preferred orientation. More precisely, the zinc fibers and needles can be defined as filaments, the major part of which is composed of a thin elongated central spine portion consisting essentially of one or more single crystals preferentially orientated with an $a$ axis ([100] or [010] direction) parallel to the axis of the filament, i.e., an $a$ axis coincides with the primary direction of growth. The polydirectional side growths or branches are essentially polycrystalline and may be either granular, dendritic or platelet in form. The crystals are generally of an irregular shape in cross-section and have a fairly large grain size as compared to other conventional forms of zinc such as zinc powder. The zinc fibers and needles are further characterized by an exceptional purity, i.e., they are substantially free of metallic impurities, containing only trace amounts of such impurities as aluminum, copper, lead and tin. The length of the zinc fibers and needles may vary from relatively short fibers of about ⅛ inch to long fibers of about 2 inches while the needles may vary from short needles of about ⅛ inch to long needles of up to about 4 inches in length. The average diameter or width of the fibers and needles is about six thousandths of an inch.

As disclosed in the Louzos application Ser. No. 25,490, the zinc fibers and needles are prepared by the electrolysis of a soluble zinc salt-containing electrolyte under conditions of extremely high cathode current density, i.e., at least about 500 amperes per square foot. The zinc fibers and needles electrodeposit or "electroform" at the cathode as individual fibers and needles or as an interconnected skeletal zinc fibrous mat when the electrolysis is allowed to continue after the formation of the individual fibers or needles. The interconnected skeletal zinc fibrous mats consist basically of multiple fibers or needles joined to one or more neighboring fibers or needles throughout the mat. A more detailed description of the zinc fibers and needles and the method for their production is given in the Louzos application Ser. No. 25,490, which is incorporated herein by reference.

The preferred form of porous, electrolyte, absorbent, extended area metal anode for use in the oxygen-depolarized cell of the invention is fabricated by compression molding the mechanically or electrolytically formed filaments, e.g., fibers or needles, of the electrochemically active metal or expanded metal sheet. When the mechanically or electrolytically formed zinc fibers or needles are used, the fibers or needles are placed within the mold and then compressed to form an anode compact of the desired size and configuration. In so forming the anode compact, the fibers or needles will readily contact one another at many points along their length and also readily interlock with one another producing a highly porous and cohesive anode body which is capable of supporting its own weight.

In some cases it may be desirable to add strength to the anode compact by compression molding the mechanically or electrolytically formed zinc fibers or needles onto a carrier sheet material. The carrier material should be an open mesh, grid or screen and preferably is made of the same electrochemically active metal. An expanded zinc metal sheet has been used successfully as the carrier material. In forming the anode compact, the zinc fibers or needles may be compression molded onto one or both sides of the carrier material. Preferably, the metal fibers are compression molded inside an outer envelope or cage formed by the carrier material. Some applications may require a more rugged carrier material such as copper, brass, or silver screen which can be electroplated with zinc prior to forming the carrier envelope. Upon amalgamation, the base metal of copper, brass or silver does not become embrittled to the degree experienced with plain zinc.

Generally speaking, the size of the mechanically or electrolytically formed zinc fibers or needles used in the fabrication of the anodes is not necessarily critical. The fibers or needles should not be so short as to create difficulties in handling and use of the individual fibers or needles or to cause the fibers or needles to become intermixed so closely that when compression molded they form an excessively dense body. On the other hand, the fibers and needles should not be too long as to preclude them from being uniformly and easily spread in the mold. It has been found that the zinc fibers or needles preferably should range in size from about ¼ inch to about 1 inch in length and from about 0.003 inch to about 0.015 inch in width. As a general rule, a preferred length-to-width ratio for the individual fibers or needles should be above about 20:1.

Anode compacts for use in the oxygen-depolarized cell of the invention most advantageously are fabricated in accordance with the teachings of the copending application Ser. No. 738,474 of W. G. Darland, Jr., filed June 20, 1968, now abandoned. As disclosed in that application, it has been surprisingly discovered that a significant improvement in electrode coulometric efficiency, i.e., percent of theoretically available ampere-hour capacity derived from a known weight of the anode material, can be attained if the anode compact is fabricated by compression molding the elongated forms of the electrochemically active metal to a controlled low bulk density below that of conventional "pressed powder" electrodes of the prior art, i.e., below about 2.5 grams per cubic centimeter but which at the same time is not less than about one gram per cubic centimeter based on the total bulk volume of the anode compact, i.e., including the open mesh, grid or screen carrier material, if used. It has been further found that this significant improvement in electrode coulometric efficiency may be attained for anode compacts utilizing a variety of elongated forms of the electrochemically active metal having widely different specific surface areas, i.e., the specific surface area of the electrochemically active metal is not a significant factor in the attainment of the improved electrode coulometric efficiencies of anode compacts used in the oxygen-depolarized cell of the invention. As one illustration, anode compacts made by compression molding electrolytically formed zinc fibers having a real surface area of about 4000 square centimeters per gram performed with an electrode coulometric efficiency of about 80 percent when used in an oxygen-depolarized cell discharged at a current density of about 250 amperes per square foot of nominal surface area; whereas anode compacts made from expanded zinc metal having a calculated real surface area of only about 20 square centimeters per gram performed with a nearly equivalent electrode coulometric efficiency when discharged at the same current density.

From the standpoint of attaining reasonably high electrode efficiencies of about 70 percent of theoretical and above at electrical current drains of about 250 amperes per square foot, it has been found that the dry bulk density of the anode compact, i.e., the bulk density before the anode compact is wet with electrolyte, should be maintained within the range of from about 1 to 1.75 and preferably from about 1 to 1.50 grams per cubic centimeter. Electrode efficiencies of from about 80 to 85 percent may be obtained when the bulk density is maintained within the range of from 1 to 1.25 grams per cubic centimeter. At high current drains of about 400 amperes per square foot, electrode efficiencies approaching 70 percent of theoretical may be obtained if the bulk density of the anode compact is maintained within the range of from about 1 to 1.50 grams per cubic centimeter. With anode compacts of low bulk density below about 1 gram per cubic centimeter, the higher electrode efficiency obtained is considerably offset by increased electrode thickness and by the increased voltage drop caused by the greater average electrode spacing that is required within the cell, as well as a considerable decrease in the mechanical strength of the electrodes.

While the exact mechanism by which improved electrode coulometric efficiency is attained using low bulk density anode compacts is not entirely understood, it is believed that the increase of void volume achieved by compression molding the elongated forms of the electrochemically active metal to a controlled low bulk density has the effect of allowing the electrolyte to more readily penetrate and pass into the pores of the anode compact and thus come into contact with a greater portion of the active metal surface, and further that the increase of void volume affords additional space to accommodate the by-products of electrochemical reaction.

The invention will be more fully understood from the following detailed description of a preferred embodiment thereof having reference particularly to FIGS. 1–3 of the drawing which show the construction of a typical high rate oxygen-depolarized cell made in accordance with the invention. It will be understood, however, that the invention is not necessarily limited to the specific construction and details of the oxygen-depolarized cell illustrated and that various adaptations and modifications may be made as will readily occur to those skilled in the art.

As shown in FIG. 1, the high rate oxygen-depolarized cell 10 comprises a porous, electrolyte absorbent, extended area anode compact 12 made from elongated forms of the electrochemically active metal, a thin porous fixed-zone, oxygen-depolarizable carbon cathode 14 and a bibulous separator 16 interposed between the anode compact 12 and the cathode 14 and containing the liquid electrolyte, i.e., an aqueous solution of potassium hydroxide. The anode compact 12 and the fixed-zone, oxygen-depolarizable carbon cathode 14 are mounted within the central opening of an electrically nonconductive marginal frame 18 which is chemically inert to the alkaline environment and which may be made from any suitable caustic resistant material such as epoxy, methyl methacrylate, polysulfone and polypropylene resins, for example.

The electrically nonconductive marginal frame 18 is provided with a pair of recessed portions 20, 22 along its innermost edges for respectively securing in place the outer periphery of both the porous, electrolyte absorbent, extended area anode compact 12 and the fixed-zone, oxygen-depolarizable carbon cathode 14. The recess 20 for accommodating the anode compact 12 is formed adjacent to one side of the marginal frame 18.

A gas-permeable, electrically conductive spacer member 24 is disposed adjacent to the gas side of the fixed zone, oxygen-depolarizable carbon cathode 14. The spacer member 24 should be of such a construction as to contact the surfaces on the gas side of the cathode 14 at a number of small points so as not to mask off a large area of the cathode 14 and thus to provide a gas space adjacent to the gas side of the cathode 14 while also serving as an electrical current collector member. Suitably the spacer member 24 may be made from expanded metal, mesh or screen which is chemically inert to a moist oxidizing environment, e.g., expanded nickel or nickel screen.

If desired, an electrically conductive, gas barrier plate 28 may be mounted adjacent to the side wall of the electrically nonconductive marginal frame 18 and maintained in electrical contact with the spacer member 24. An opening or port 30 is provided in the gas barrier plate 28 for introducing oxygen as the oxidant fuel into the gas space formed adjacent to the gas side of the cathode 14.

If desired, the oxygen-depolarized cell can be assembled dry and the electrolyte introduced at a later time through a filling port provided at a suitable location in the frame 18, thus making the cell a reserve primary cell and providing a much longer storage period.

The porous, electrolyte absorbent, extended area anode compact 12 in the embodiment illustrated comprises a compressed body of mechanically or electrolytically formed zinc fibers 32 supported within an envelope or cage 34 of expanded metal. As shown in greater detail in FIGS. 2 and 3, the envelope or cage 34 of expanded metal serves as the carrier and electronic contact member for the zinc fibers 32 and the whole anode assembly is mounted on one side of an anode backing plate 36. The envelope or cage 34 of expanded metal and the anode backing plate 36 are preferably made of zinc or other metal which is compatible with zinc in the alkaline cell environment. In other types of cell constructions, the backing plate may be omitted and the cage may be formed to completely surround the zinc fibers 32 so that electrolytic access to both sides of the anode can be achieved.

In the embodiment of the oxygen-depolarized cell illustrated in FIG. 1, the anode compact 12 is positioned inside the recessed portion 20 formed around the inner periphery of the electrically nonconductive marginal frame 18. The anode backing plate 36 is then mounted adjacent to the other side wall of the frame 18.

FIG. 4 shows a modification of the porous, electrolyte absorbent, extended area anode compact,. In this modification, the anode compact is made from two or more superimposed sheets 38, 40 of expanded zinc metal. The expanded metal sheets 38, 40 are superimposed upon one another in such a manner that the grid structures of each are arranged in random orientation and are then spot welded to each other at various points and compressed to form a composite unit structure. The anode compact so formed is then placed against an anode backing plate 42 and assembled into the cell in the same manner as before described. In other types of cell constructions, the anode backing plate may again be omitted and the anode compact of expanded metal sheets used with an appropriate contact member such as a zinc-plated expanded copper grid inserted between the layers of expanded metal.

As previously indicated, the thin, porous, fixed-zone, oxygen, depolarizable cathode used in the cell of the invention comprises, in its broadest aspect, a porous conductive body having at least two zones: a first zone, extending inwardly from the electrolyte side of the electrode, which is highly permeable to the liquid electrolyte and highly active electrochemically; and a second zone, adjacent the first zone, which is gas-permeable and highly repellent to the liquid electrolyte. The first zone which may be made up of a plurality of layers, consists of finely-divided active particles having a high surface area, such as activated carbon or mixtures of carbon and fine metal powders. The first zone is designed to be very active electrochemically and may contain a catalyst, such as one of the platinum metals, to promote the electrochemical reactions. The active particles in the first zone are bonded together by a suitable binder such as a thermoplastic resin or carbonized pitch. The active particles in the first zone should also be very finely divided, such as carbon flour, to make the zone microporous and thereby inhibit the bubbling of gas therethrough. The average pore size of the active particles of the first zone is preferably in the range of about 0.1 to 1 micron. The second zone differs from the first zone in that it is repellent to liquid electrolyte, is not activated or catalyzed and is made of larger conductive particles to provide larger pore sizes. In other words, the second zone is designed to be highly electrolyte repellent and gas permeable, but not electrochemically active. The liquid repellency of the second zone may be achieved in a number of different ways. For example, the second zone may be made of inherently liquid repellent materials such as powdered graphite or inactive metal powders, and/or the particles may be bonded together with a relatively large amount of a liquid repellent thermoplastic binder, such as polyethylene. Similarly, the second zone may be made liquid repellent by impregnating it with paraffin or other wet proofing agent. As indicated, the second zone should have larger pore sizes than the first zone so as to facilitate gas entry and water vapor removal and to reduce capillary attraction for liquid. Thus, the pore sizes in the second zone are preferably in the range of about 1 to 20 microns. Both the first and second zones, of course, should have a high electrical conductivity in order to keep the electrode resistance to a minimum.

Although there are many variations of the thin, porous, fixed-zone, oxygen-depolarizable cathode which can be used as described in the above referred to United States Pat. No. 3,423,247, issued to W. G. Darland, Jr. et al., the preferred form of cathode for use in the high rate oxygen-depolarized cell of the invention is shown in FIG. 5. As shown, the thin porous cathode comprises a multiplicity of layers 44, 46 and 48 of finely divided conductive particles supported on a thin sintered nickel plaque 50, the three layers providing a gradient of electrolyte repellency, electrochemical activity and pore size from one electrode surface to the other. Proceeding from the electrolyte side of the cathode, the first two layers 44 and 46 consist essentially of a mixture of very finely-divided activated carbon particles and a thermoplastic resin binder, the outermost layer 44 containing a less amount of the thermoplastic binder and consequently is more permeable to the liquid electrolyte. The third layer 48 consists essentially of a mixture of finely-divided unactivated carbon particles of a size which is larger than the particle size in the first two layers and a thermoplastic binder, this layer containing the same or a greater amount of the thermoplastic binder as in the layers 44 and 46. The carrier or sintered nickel plaque 50 possesses a low porosity, about 40 percent porosity, and is highly wetproofed suitably by immersion in a solution of the thermoplastic binder or other wet proofing agent as well known in the art.

In the preferred form of cathode shown in FIG. 5, the first zone, designated as zone A, which is highly permeable to the liquid electrolyte and highly active electrochemically, comprises the layers 44 and 46 and the second-zone, designated zone B, which is gas-permeable and highly repellent to the liquid electrolyte, comprises the layer 48.

The method for fabricating the preferred form of cathode may be represented by the following example: A small sintered nickel plaque approximately 1 square inch by 0.015 inch thick and having a porosity of about 40 percent was impregnated on one side, the gas side of the cathode, with an emulsion of Teflon (polytetrafluoroethylene), i.e., a 40 percent polytetrafluoroethylene emulsion. On the opposite face of the nickel plaque was placed a thin layer of a mixture of unactivated carbon particles of a size of approximately 5800 microns and 55 percent by weight of polytetrafluoroethylene as the thermoplastic binder. The next layer consisted of a mixture of activated carbon particles of a size of approximately 1700 to 2900 microns and 55 percent by weight polytetrafluoroethylene, and the last layer consisted of a mixture of activated carbon particles of a size of less than about 1700 microns and 35 percent by weight of polytetrafluoroethylene. The layered electrode was then molded at a pressure of about 1000 p.s.i. The finished electrode thickness was about 0.025 inch.

It will be seen from the above example that the porous, fixed-zone, oxygen-depolarizable cathode fabricated for use in the cell of the invention possesses a thickness which is considerably smaller than the relatively thick, approximately ¼ inch or more, porous carbon electrodes used in prior art cells.

The thin, porous, fixed-zone, oxygen-depolarizable cathode may contain a catalyst on the active electrolyte side of the electrode although an uncatalyzed cathode possesses considerable activity. Catalyzing the electrode with a noble metal catalyst, e.g., platinum, in amounts of between about 0.25 and 1 mg./cm.$^2$ increases the operating voltage of the cell and can represent about a 5 percent increase in system power density at high rates of discharge.

The electrolyte used in the oxygen-depolarized cell of the invention is an aqueous solution of potassium hydroxide having a concentration of between about 10 and 14 normal. The anode reactions which take place using an aqueous potassium hydroxide electrolyte at low concentrations of between 4 and 6.5 normal, produce a crystalline zinc hydroxide reaction product which is disadvantageous in that it can readily cause passivation of the zinc anode. At high electrolyte concentrations of above about 7.5 normal but less than 9 normal, the reaction product is a zinc oxide which is relatively hard and may be adherent to the surfaces of the anode. With electrolyte concentrations within the range of between about 10 and 14 normal, it has been found that the anode reaction product is a zinc oxide which is relatively soft and non-adherent and does not passivate the zinc anode.

It has also been found in accordance with the invention that for optimum performance of the oxygen-depolarized cell, the potassium hydroxide electrolyte should contain initially an amount of zinc oxide sufficient to saturate the elctrolyte. The effect of saturating the eletrolyte with zinc oxide is to provide for improved voltage regulation of the cell during the early period of discharge.

FIG. 6 shows a typical discharge curve for an oxygen-depolarized cell in accordance with the invention operating with air as the oxidant. It will be seen that during the early discharge period (first ten minutes) the discharge curve of the cell without the zinc oxide drops off rapidly from an initial voltage of about 1.0 volt to a normal operating voltage of about 0.8 volt. However, when zinc oxide is added in an amount sufficient to saturate the electrolyte, the discharge curve during the early period of discharge as represented by the broken lines in FIG. 6, drops off gradually to its normal operating voltage so that a flatter discharge curve is obtained.

The quantity of electrolyte solution to be used in the oxygen-depolarized cell of the invention should be sufficient to thoroughly soak into the separator and into the void spaces in the anode compact. Generally speaking, for high rate performance, the quantity of electrolyte used should be between about 0.5 and 1.5 milliliters per ampere-hour of service. The electrolyte can be used in quantities in excess of 1.5 milliliters per ampere-hour but this generally increases weight and lowers the volumetric efficiency of the cell.

The separator material used in the oxygen-depolarized cell of the invention should be highly absorbent to the liquid electrolyte and dimensionally stable in the alkaline environment. A particularly good separator material is a nylon non-woven fabric, although the preferred separator material is an alkali treated cotton non-woven fabric produced under the tradename of "Webril" (Kendall Co.).

Zinc-oxygen cells made in accordance with the invention are capable of supplying power at very high electrode current densities from about 200 to 1000 amperes per square foot which represent a significant advance in the art. It will be appreciated that this significant improvement in cell performance is due mainly to the use in these cells of the porous, electrolyte absorbent, extended area anode compacts fabricated from the elongated forms of the electrochemically active metal. Such cells also possess a significantly improved volumetric efficiency due to the use of the thin, porous, fixed-zone, oxygen-depolarizable cathode as described in the above referred to United States Pat. No. 3,423,247 issued to W. G. Darland, Jr. et al.

In order to demonstrate the superior performance of the porous, electrolyte absorbent, extended area anodes used in the oxygen-depolarized cell of the invention, a series of tests were conducted in which a number of zinc anodes of the type used in cells of the prior art were made and compared with zinc anode compacts fabricated from electrolytically formed zinc fibers prepared in accordance with the above referred to copending application of D. V. Louzos. The prior art anodes used in the test were essentially of two types, namely a flat zinc sheet and a powder zinc anode. The zinc sheet anode was about 0.003 inch thick and weighed approximately 1.0 gram. The zinc powder anode was prepared by compression molding into the the bottom of a ⅝ inch diameter plastic cup 0.5 gram of zinc powder at a pressure of about 330 p.s.i. A 40 x 40 mesh nickel screen (approximately 0.005 inch diameter wire) was then wedged on top of the granular pack. The porous, electrolyte absorbent, extended area anode compacts were prepared by compression molding 0.5 gram of the electrolytically formed zinc fibers on an expanded nickel grid in the bottom of a ⅝ inch diameter plastic cup at 165 p.s.i. and 330 p.s.i. packing pressure. The samples compression molded at a pressure of 165 p.s.i. represent the controlled low bulk density anode compacts, i.e., having a bulk density below about 2.5 grams per cubic centimeter. Some of the samples compression molded at 330 p.s.i. included a disc of expanded nickel wedged on top of the zinc fibers as a top cover or support. All of the powder and fiber electrodes had approximately the same thickness, i.e., 1/16 inch thick. For the purposes of this test, the anodes were not amalgamated and the electrolyte used had a normality of below 10 N, i.e., 30 percent KOH electrolyte. The anodes were placed in individual cells containing 12 milliliters of the KOH electrolyte. The opposing electrode was a nickel sheet on which gas was evolved during discharge. An A-C interrupter of the type disclosed in the Kordesch et al, publication (Journal of the Electrochemical Society, vol. 107, pages 480-483, June 1960) was used in the discharge tests so that voltages reported were substantially IR-free. The reference electrode was a mercury-mercuric oxide electrode with 30 percent KOH electrolyte. The cells were discharged at 400 amperes per square foot at room temperature.

Figure 7:
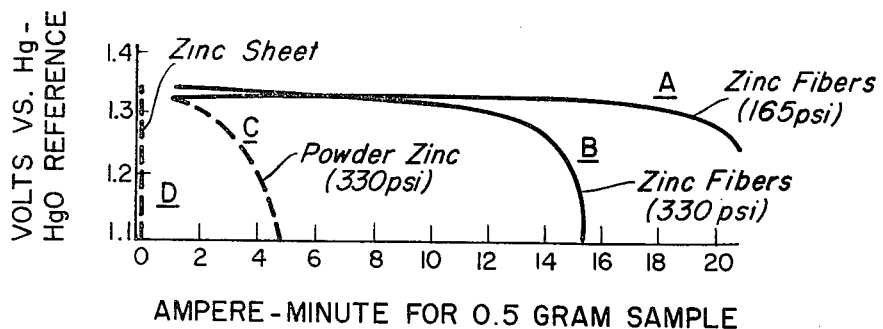
FIG. 7 is a graph comparing the performance of the preferred metal anodes verses a reference electrode with that of anodes used in cells of prior art.

FIG. 7 shows graphically the results of the test. It will be seen from the curves representing the performance of the anodes that, at a current density of 400 amperes per square foot, the maximum performance for the samples tested was exhibited by the electrolytically formed zinc fibers compacted at low molding pressures of about 165 p.s.i. as shown by curve A. It will also be observed that densifying a like amount of the fibers by application of 330 p.s.i. pressure resulted in a reduction in capacity and an increase in the slope of the discharge curve as shown in curve B. Spherical zinc powder molded at the same 330 p.s.i. pressure operated, as shown in curve C, at about 20 percent of the capacity of the electrode material illustrated in curve A and at a substantially reduced voltage output. The solid sheet zinc performance shown in curve D indicates the very severe polarization encountered with a dense smooth zinc surface at this current density.

Figure 9:
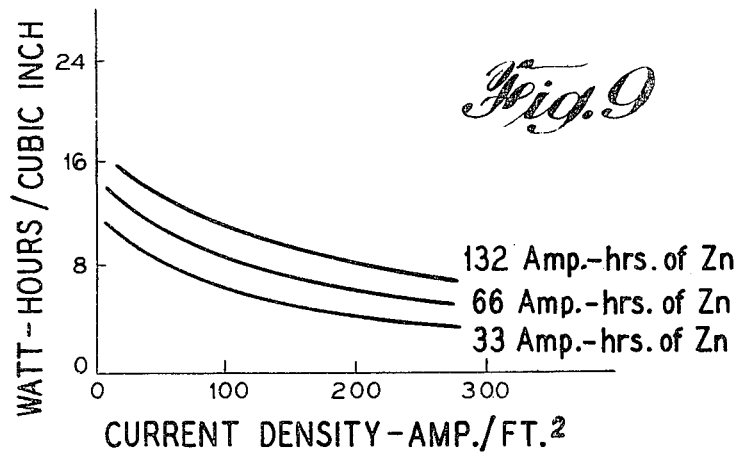
FIGS. 8, 9 and 10 are graphs illustrating the typical performance of oxygen-depolarized cells of the invention.
Figure 8:
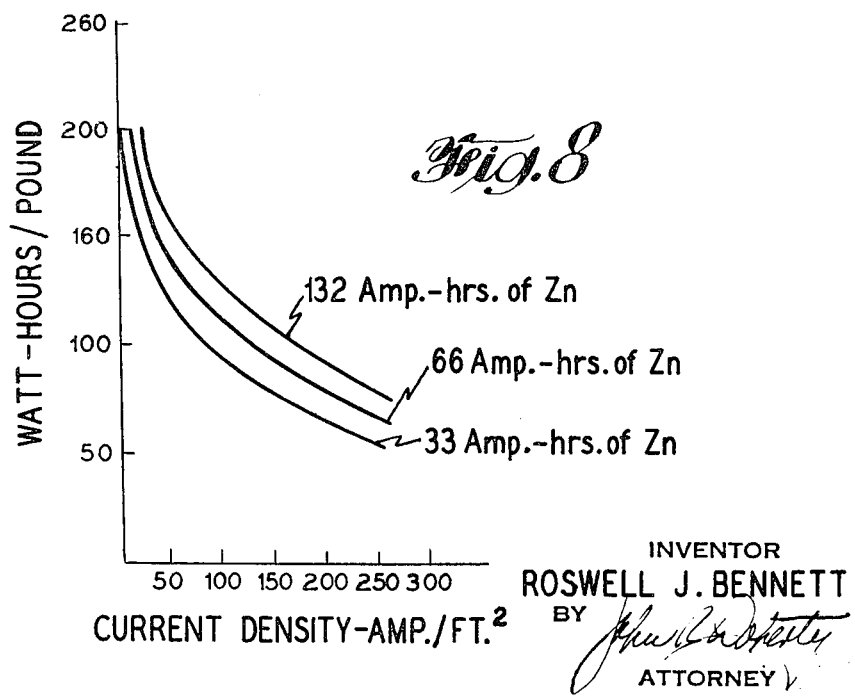

FIGS. 8 and 9 show typical performance curves for oxygen-depolarized cells utilizing the zinc fiber anodes and the thin, porous, fixed-zone carbon cathodes supplied with oxygen. The energy density of the cells in terms of watt-hours per pound and watt-hours per cubic inch were calculated and plotted against current density. The energy density calculations were based only on the practical cell elements, i.e., zinc fiber anode (including excess zinc and supporting structure), total electrolyte, oxygen cathode, and gas barrier and passages. The size and weight of the cell frame and supporting mechanical structures were not considered in making the calculations. Cells having a 66 ampere-hour capacity were discharged at various current densities and the values for cells having 132 and 33 ampere-hour capacities were then calculated for comparison purposes. It will be noted that when the cells were operated at low current densities, the energy densities per unit of cell weight and volume approaches 200 watt-hours per pound and 16 watt-hours per cubic inch. It wil also be noted that the performance of these cells approaches 75 watt-hours per pound and 5 watt-hours per cubic inch at high current densities.

Figure 10:
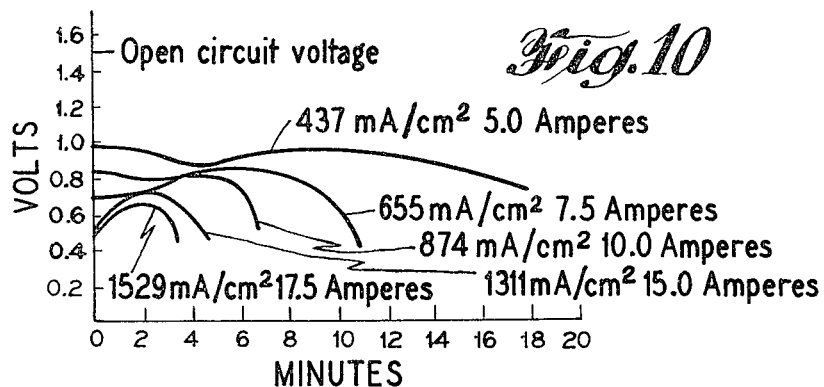

FIG. 10 shows typical performance curves for oxygen-depolarized cells of the invention supplied with oxygen and operating at various current densities. Cells employed in this test each contained 2.15 grams of zinc anode material, the anodes having a nominal area of 1.8 square inches and a thickness of 0.052 inch. The cathodes were thin, porous, fixed-zone electrodes of 1.8 square inch area and 0.025 inch thickness. The electrolyte was 10 N KOH. The current drains indicated were held constant during the test and ranged from 5.0 to 17.5 amperes, equivalent to a current density range of 437 to 1529 milliamperes per square centimeter. The cell terminal voltage (IR included) and minutes of service at these high current densities clearly demonstrate the superiority of the anode-cathode-electrolyte combination of this invention. This performance is equal to or better than that of other high rate alkaline battery systems such as the well-known silver oxide/zinc system.

FIG. 11 shows the relationship of the electrolyte concentration to the performance of the oxygen-depolarized cells. The curves shown represent the effects of varying the electrolyte concentration (KOH normality) on the watt-hour output of the cells, the cell voltage and the coulometric efficiency of the zinc anodes. The curves shown in solid lines represent electrolytes without the addition of zinc oxide and the curves shown in dotted lines represent electrolytes saturated with zinc oxide. It will be apparent from the curves that the cells employing electrolytes having a concentration within the range of from about 10 to 14 normal exhibit higher efficiency and watt-hour output and that therefore the concentration of the electrolyte is an important factor in the performance of the cells.

What is claimed is:

1. A high rate oxygen-depolarized galvanic cell comprising, in combination:
   (a) a porous, electrolyte absorbent, extended area anode compact comprising randomly orientated, elongated forms of zinc metal in pressure formed, multi-point, physical contact with one another throughout the body of the anode compact, the dry milk density of said anode compact being between about 2.5 and 1 gram per cubic centimeter;
   (b) a thin porous oxygen-depolarizable cathode having at least a first zone extending inwardly from the electrolyte side of said cathode, which is highly permeable to liquid electrolyte and highly active electrochemically, and a second zone, adjacent to the first zone, which is gas-permeable and highly repellent to liquid electrolyte;
   (c) a porous ionically permeable separator interposed between said anode and the electrolyte side of said cathode; and
   (d) a liquid electrolyte contained in said separator, said liquid electrolyte comprising an aqueous alkaline solution of potassium hydroxide having a concentration of between about 10 and 14 normal.

2. The oxygen-depolarized galvanic cell as defined by claim 1 wherein the dry bulk density of the anode compact is between about 1.5 and 1 gram per cubic centimeter.

3. The oxygen-depolarized galvanic cell as defined by claim 1 wherein the dry bulk density of the anode compact is between about 1.25 and 1 gram per cubic centimeter.

4. The oxygen-depolarized galvanic cell as defined by claim 1 wherein the anode compact is fabricated from mechanically formed zinc fibers.

5. The oxygen-depolarized galvanic cell as defined by claim 1 wherein the anode compact is fabricated from elongated forms of zinc metal selected from the group consisting of electrolytically formed zinc fibers and needles.

6. The oxygen-depolarized galvanic cell as defined by claim 5 wherein the electrolytically formed zinc fibers and needles comprise filaments having a central spine portion with at least a few polydirectional side growths of granular, dendritic or platelet form, the central spine portion of the filaments consisting essentially of one or more single crystals preferentially orientated with an $a$ axis ([100] or [010] direction) parallel to the axis of the filament.

7. The oxygen-depolarized galvanic cell as defined by claim 6 wherein the electrolytically formed zinc fibers and needles possess a specific surface area of between about 0.4 and 0.6 square meters per gram, a length of from about ⅛ inch to about 4 inches and an average diameter of about six thousandths of an inch.

8. The oxygen-depolarized galvanic cell as defined by claim 1 wherein the anode compact is supported on a carrier material.

9. The oxygen-depolarized galvanic cell as defined by claim 8 wherein the anode compact comprises a compressed body of elongated forms of zinc metal selected from the group consisting of zinc fibers and needles supported within an envelope of expanded metal.

10. The oxygen-depolarized galvanic cell as defined by claim 1 wherein the anode compact is fabricated from at least two sheets of superimposed expanded zinc metal.

11. The oxygen-polarized galvanic cell as defined by claim 1 wherein the cathode comprises three layers of finely-divided conductive particles, the first two layers consisting essentially of a mixture of finely-divided activated carbon particles and a thermoplastic resin binder, one of said first two layers being exposed to the electrolyte and containing a less amount of the thermoplastic binder, and the third layer adjacent to the second of the first two layers consisting essentially of a mixture of finely-divided unactivated carbon particles and a thermoplastic binder, the particle size of the carbon particles in said third layer being greater than the particle size of the carbon particles in said first two layers of the cathode.

12. The oxygen-depolarized galvanic cell as defined by claim 11 wherein the three layers of the cathode are supported on a thin sintered nickel plaque positioned adjacent to the third layer and having a porosity of about 40 percent, the sintered nickel plaque being impregnated with a thermoplastic binder as a wetproofing agent.

13. The oxygen-depolarized galvanic cell as defined by claim 12 wherein the three layers of the cathode are catalyzed with a platinum group metal.

14. The oxygen-depolarized galvanic cell as defined by claim 1 wherein the aqueous potassium hydroxide electrolyte contains an amount of zinc oxide sufficient to saturate the electrolyte.

15. The oxygen-depolarized galvanic cell as defined by claim 1 wherein the quantity of aqueous potassium hydroxide electrolyte is between about 0.5 and 1.5 milliliters per ampere-hour of anode material.

16. The oxygen-depolarized galvanic cell as defined by claim 1 wherein the ionically permeable separator is made from a material selected from the group consisting of a nylon non-woven fabric and an alkali treated cotton non-woven fabric.

17. A high rate oxygen-depolarized galvanic cell comprising, in combination:
   (a) a porous, electrolyte absorbent, extended area anode compact comprising randomly orientated, elongated forms of zinc metal in pressure formed, multi-point, physical contact with one another throughout the body of the anode compact, the dry bulk density of the anode compact being between about 1.5 and 1 gram per cubic centimeter;
   (b) a thin porous oxygen-depolarizable cathode comprising three layers of finely-divided conductive particles, the first two layers consisting essentially of a mixture of finely-divided activated carbon particles and a thermoplastic resin binder, one of said first two layers containing a less amount of said thermoplastic binder and constituting the electrolyte side of said cathode and the third layer adjacent to the second of the first two layers consisting essentially of a mixture of finely-divided unactivated carbon particles and a thermoplastic binder, the particle size of the carbon particles in said third layer being greater than the particle size of the carbon particles in said first two layers of said cathode;
   (c) a porous ionically permeable separator interposed between said anode and the electrolyte side of said cathode; and
   (d) a liquid electrolyte contained in said separator, said liquid electrolyte comprising an aqueous alkaline solution of potassium hydroxide having a concentration of between about 10 and 14 normal.

References Cited

UNITED STATES PATENTS

| | | | |
|---|---|---|---|
| 2,597,116 | 5/1952 | Marsal et al. | 136—86 AU X |
| 3,556,856 | 1/1971 | Elbert | 136—86 D |
| 3,440,098 | 4/1969 | Stachurski | 136—86 A |
| 3,468,718 | 9/1969 | Vohler et al. | 136—122 |
| 3,539,396 | 11/1970 | Wagner | 136—86 A |
| 680,848 | 8/1901 | Erny | 136—128 |
| 745,274 | 11/1903 | Buhne | 136—74 |
| 3,479,225 | 11/1969 | Chodosh et al. | 136—86 A |
| 3,069,486 | 12/1962 | Solomon et al. | 136—125 X |
| 2,912,478 | 11/1959 | Justi et al. | 136—86 D |

FOREIGN PATENTS

| | | | |
|---|---|---|---|
| 821,690 | 10/1959 | Great Britain | 29—192 |
| 117,837 | 6/1957 | Russia | 136—86 A |
| 143,849 | 3/1961 | Russia | 136—86 A |

ALLEN B. CURTIS, Primary Examiner

U.S. Cl. X.R.

136—121, 125, 130